(12) United States Patent
Shimazaki et al.

(10) Patent No.: US 7,735,933 B2
(45) Date of Patent: *Jun. 15, 2010

(54) WOVEN BELT

(75) Inventors: Sadayuki Shimazaki, Tokyo (JP); Itsuo Tabayashi, Tokyo (JP)

(73) Assignee: Takata Corporation, Tokyo (JP)

(*) Notice: Subject to any disclaimer, the term of this patent is extended or adjusted under 35 U.S.C. 154(b) by 167 days.

This patent is subject to a terminal disclaimer.

(21) Appl. No.: 11/802,682

(22) Filed: May 24, 2007

(65) Prior Publication Data

US 2008/0139066 A1 Jun. 12, 2008

(30) Foreign Application Priority Data

Dec. 11, 2006 (JP) ............................. 2006-333433

(51) Int. Cl.
*B60R 22/00* (2006.01)
*B60R 22/34* (2006.01)
*D03D 15/00* (2006.01)

(52) U.S. Cl. ................. 297/474; 297/483; 280/807; 442/189

(58) Field of Classification Search ............ 297/474, 297/483; 442/189, 192, 197, 199, 200; 280/808, 280/807; 139/383 R
See application file for complete search history.

(56) References Cited

U.S. PATENT DOCUMENTS

| 3,847,434 A | * 11/1974 | Weman | 297/478 |
| 5,219,636 A | * 6/1993 | Golz | 428/193 |
| 5,298,321 A | 3/1994 | Isoda et al. | |
| 5,634,499 A | * 6/1997 | Kikuchi et al. | 139/387 R |
| 5,713,601 A | 2/1998 | Bönigk | |
| 2005/0150062 A1 | 7/2005 | Bosman et al. | |
| 2006/0005913 A1 | 1/2006 | Berger | |
| 2006/0016546 A1 | 1/2006 | Berger | |

FOREIGN PATENT DOCUMENTS

| EP | 1 134 313 A2 | 9/2001 |
| EP | 1 790 762 A2 | 5/2007 |
| EP | 1 849 898 A1 | 10/2007 |
| GB | 2 040 327 A | 8/1980 |
| JP | 2-46881 A | 3/1990 |
| JP | 7-207582 A | 5/1995 |
| JP | 7-309200 A | 11/1995 |
| JP | 8-72668 A | 3/1996 |
| JP | 8-188938 A | 7/1996 |
| JP | 8-299161 A | 11/1996 |
| JP | 9-31850 A | 2/1997 |
| JP | 9-323619 A | 12/1997 |
| JP | 10-121323 A | 5/1998 |
| JP | 2000-248469 A | 9/2000 |
| JP | 2001-234477 A | 8/2001 |
| JP | 2001-294122 A | 10/2001 |
| JP | 2001-295153 A | 10/2001 |
| JP | 2002-29372 A | 1/2002 |

(Continued)

*Primary Examiner*—Milton Nelson, Jr.
(74) *Attorney, Agent, or Firm*—Foley & Lardner LLP

(57) ABSTRACT

The disclosed woven belt may include first filament yarn bundles extending in a substantially longitudinal direction of a webbing and second filament yarn bundles extending in a substantially transverse direction of the webbing. At least one of the first filament yarn bundles and the second filament yarn bundles may comprise filament yarn bundles containing middle-shrinking synthetic filament yarns.

10 Claims, 9 Drawing Sheets

FOREIGN PATENT DOCUMENTS

| | | |
|---|---|---|
| JP | 2002-240680 A | 8/2002 |
| JP | 2002-526331 A | 8/2002 |
| JP | 2002-362304 A | 12/2002 |
| JP | 2004-315984 A | 11/2004 |
| WO | WO 2006/088163 A1 | 8/2006 |

* cited by examiner

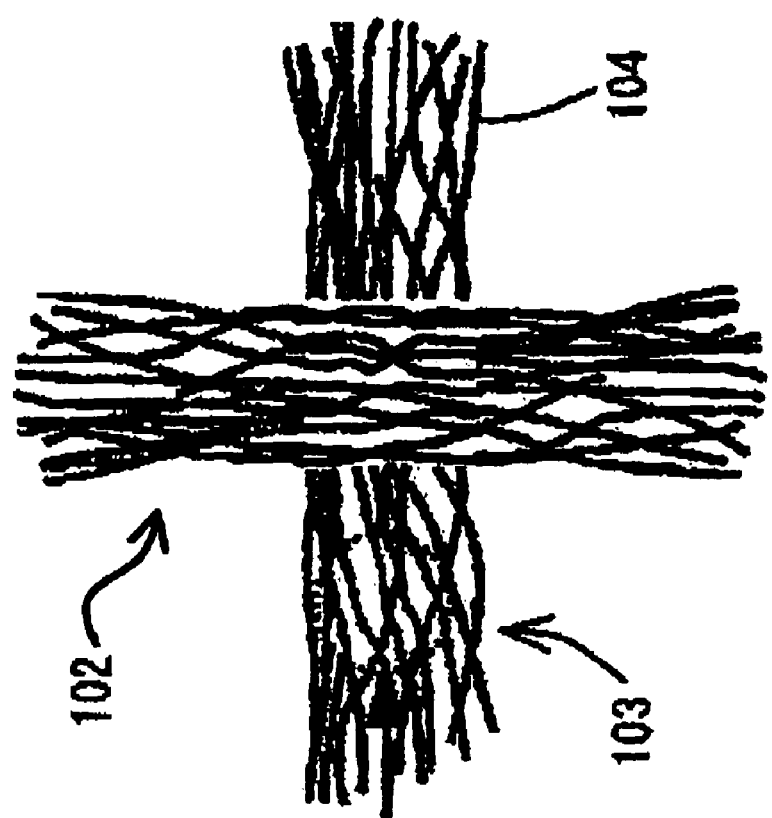
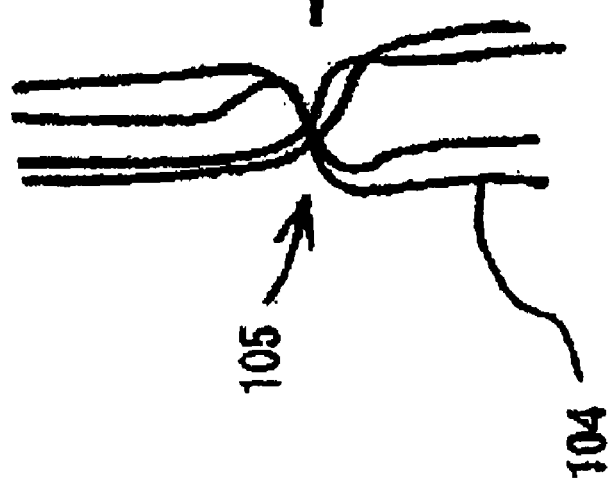
FIG. 8(a)
FIG. 8(b)

WOVEN BELT

BACKGROUND

The present invention relates to a woven belt prepared by weaving a plurality of filament yarn bundles substantially orthogonal to each other into a strip, and in particular, to a woven belt having a high load-bearing strength and a seatbelt device incorporating the woven belt as a webbing.

Woven belts prepared by weaving high-strength filament yarns have been widely used as strips for restraining heavy articles and for bundling together a plurality of materials and the like. One well-known example of an application for such woven belts is a webbing for a seatbelt device for restraining the bodies of occupants onto seats such as those of vehicles.

Webbings of seatbelt devices are required to fulfill various quality requirements regarding comfort during fastening and ease of withdrawing the webbing from a reactor, i.e., a device for retracting the webbing, in addition to the basic requirement of a sufficient load-bearing capacity for restraining the body of an occupant in the event of a vehicle collision. Accordingly, various techniques for improving the filament yarns for use in woven belts and weaving structures of the belts have been proposed (for example, refer to Japanese Unexamined Patent Application Publication No. 2004-315984).

A woven belt by its nature is not for temporary use but for repetitive use. For example, in the aforementioned example of the seatbelt device, an occupant fastens the belt as the occupant enters a vehicle and unfastens it as the occupant exits the vehicle. When the belt is used for material handling or for hey articles, the belt is unfastened after it is used to restrain or bundle articles and fastened again next time the belt is used.

Because woven belts are expected to be repeatedly fastened and unfastened and put under large tension during use, they preferably have as high a wear resistance as possible.

SUMMARY

An object of an embodiment of the present invention is to provide a woven belt with improved wear resistance and a seatbelt device incorporating the woven belt.

In order to achieve the object, a first embodiment of the present invention may provide a woven belt containing first filament yarn bundles extending in a substantially longitudinal direction of a webbing and second filament yarn bundles extending in a substantially transverse direction of the webbing. At least one of the first filament yarn bundles and the second filament yarn bundles may include a filament yarn bundle containing a middle-shrinking synthetic filament yarn which has a shrinkage ratio of the size after shrinkage of 15% to 20% relative to the size before shrinkage.

When middle-shrinking synthetic filament yarns having a thermal shrinkage ratio higher than that of normal synthetic filament yarns are used in the first filament yarn bundle or the second filament yarn bundle, the filament yarn bundles melt by heat treatment and thereby strongly adhere to surrounding filament yarn bundles through fusion-bonding, resulting in improved strength. As a result, wear resistance can be enhanced. In addition, when a shrinkage ratio of the size after shrinkage relative to the size before shrinkage of the middle-shrinking synthetic filament yarn is set to be 15% to 20%, fusion-bonding effect is accelerated during shrinkage by heat treatment and the strength of the filament yarn bundles as a whole can be improved. Further, when the shrinkage ratio is kept relatively low, the transportation performance can be improved because the filament yarns hardly shrink (the property of the filament yarns is hardly aged) even in a high-temperature environment.

A second embodiment of the present invention may be characterized in that, along with the features of the first embodiment, the first filament yarn bundles may be filament yarn bundles containing normal synthetic filament yarns and the second filament yarn bundles may be filament yarn bundles containing the middle-shrinking synthetic filament yarns. While filament yarn bundles of normal synthetic filament yarns are used as the first filament yarn bundles, the strength of the filament yarn bundles can be increased by using the middle-shrink synthetic filament yarns in the second filament yarn bundles. Thus, the strength and the wear resistance can be improved compared to when both the first and second filament yarn bundles are normal filament yarn bundles.

A third embodiment of the present invention may be characterized in that, along with the features of either the first or second embodiment, the middle-shrinking synthetic filament yarns may contain a low-melting-point filament component having a relatively low melting point and a high-melting-point filament component having a relatively high meting point. A significantly high fusion-bonding effect can be attained by heat treatment, which causes, for example, local fusing of the low-melting-point filaments.

A fourth embodiment of the present invention may be characterized in that, along with the features of the third embodiment, the middle-shrinking synthetic filament yarns may contain the low-melting-point filament component dispersed in the high-melting-point filament component. By heat treatment, the dispersed low-melting-point filament fuses and securely melt-bonds with the surrounding yarns.

A fifth embodiment of the present invention may be characterized in that, along with the features of either the third or fourth embodiment, the melting point of the high-melting-point filament component is 250° C. to 260° C., and the melting point of the low-melting-point filament component is not less than 160° C. and less than 250° C. In this manner, the low-melting-point filament can be fused without decreasing the strength of the high-melting-point filament component, by curing at 200° C. to 230° C. for 90 to 180 seconds.

A sixth embodiment of the present invention may be characterized in that, along with the features of any of the first to fifth embodiments, the density of one of the first filament yarn bundles and the second filament yarn bundles may be 20 picks or less per inch of the other filament yarn bundle. By decreasing the density of one of the filament yarn bundles to 20 or less, the other filament yarn bundles weaved therewith exhibit gentle undulating shapes after weaving, and the stress concentration at the curved portions can be reduced. This arrangement also increases the strength.

A seventh embodiment of the present invention may be characterized in that, along with the features of any of the first to sixth embodiments, at least one of the first filament yarn bundles and the second filament yarn bundles is filament yarn bundles containing non-twist yarns with an entanglement.

Because the first or second filament yarn bundle may contain the middle-shrinking synthetic filament yarns and have entanglements, the strength and wear resistance can be improved using non-twist yarns without using expensive twisted yarns. Thus, the production cost can be reduced.

An eighth embodiment of the present invention may provide a seatbelt device including a woven belt for restraining an occupant; a retractor device that can retract the woven belt; a buckle connected to a fixed side member; and a tongue that engages with the buckle, the tongue being attached to the woven belt, in which the woven belt includes first filament yarn bundles extending in a substantially longitudinal direction of a webbing and second filament yarn bundles extending in a substantially transverse direction of the webbing, at least one of the first filament yarn bundles and the second filament yarn bundles including filament yarn bundles containing middle-shrinking synthetic filament yarns.

In the seatbelt device of the eighth embodiment, the middle-shrinking synthetic filament yarns that undergoes fusion bonding by heating may be used to form the first or second filament yarn bundle of the woven belt. Because the yarns melt and strongly adhere onto surrounding filament yarn bundles through fusion bonding, the strength can be enhanced. As a result, the strength of the filament yarn bundles as a whole can be increased, and the wear resistance can be improved.

According to a woven belt and a seatbelt device incorporating the woven belt of the present invention, the strength and wear resistance of the woven belt can be improved.

It is to be understood that both the foregoing general description and the following detailed description are exemplary and explanatory only, and are not restrictive of the invention as claimed.

BRIEF DESCRIPTION OF THE DRAWINGS

The features, aspects, and advantages of the present invention will become apparent from the following description, appended claims, and the accompanying exemplary embodiments shown in the drawings, which are briefly described below.

FIG. 8(*a*) is an enlarged view of a part of the weft yarn of a non-twist yarn marked by a dashed circle in FIG. 8(*b*), and FIG. 8(*b*) shows a part where a weft yarn intersects a warp yarn.

DETAILED DESCRIPTION

The embodiments of the present invention will now be described with reference to the drawings. In the description below, an example of applying a woven belt according to an embodiment of the present invention to a webbing of a seatbelt device is described, and an embodiment related to an over structure of a common seatbelt device and an embodiment related to a woven belt serving as a webbing of the seatbelt device are described.

Figure 1:
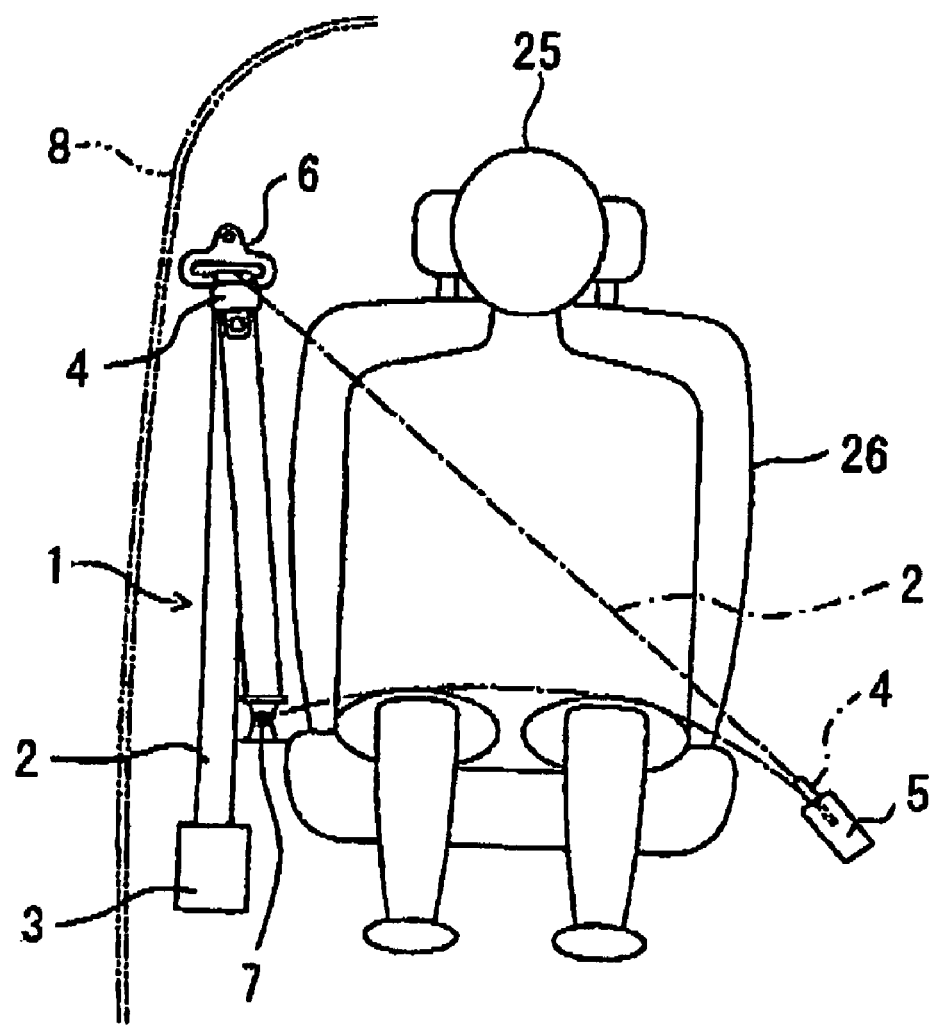
FIG. 1 is a front view showing the overall structure of a seatbelt device according to an embodiment of the present invention along with an occupant.

First, a seatbelt device according to an embodiment of present invention to which a woven belt can be applied is explained. FIG. 1 is a front view showing an overall structure of a seatbelt device according to an embodiment of the present invention, along with an occupant.

In FIG. 1, a seatbelt device 1 may include a seatbelt 2, which is a webbing, a retractor device 3 for withdrawably retracting one end of the seatbelt 2, a tongue 4 slidably attached to the seatbelt 2, and a buckle unit 5 that engages with the tongue 4.

The seatbelt 2, i.e., the webbing, may be a woven belt woven front warp yarns (first filament yarn bundles) extending in a substantially longitudinal direction and waft yarns (second filament yarn bundles) extending in a substantially transverse direction. As described above, the belt may be retracted by the retractor device 3 from one end thereof, passed through a shoulder anchor 6 at about the middle thereof, and rotatably connected to a vehicle body 8 with a stopper 7 at the other end thereof.

Figure 2:
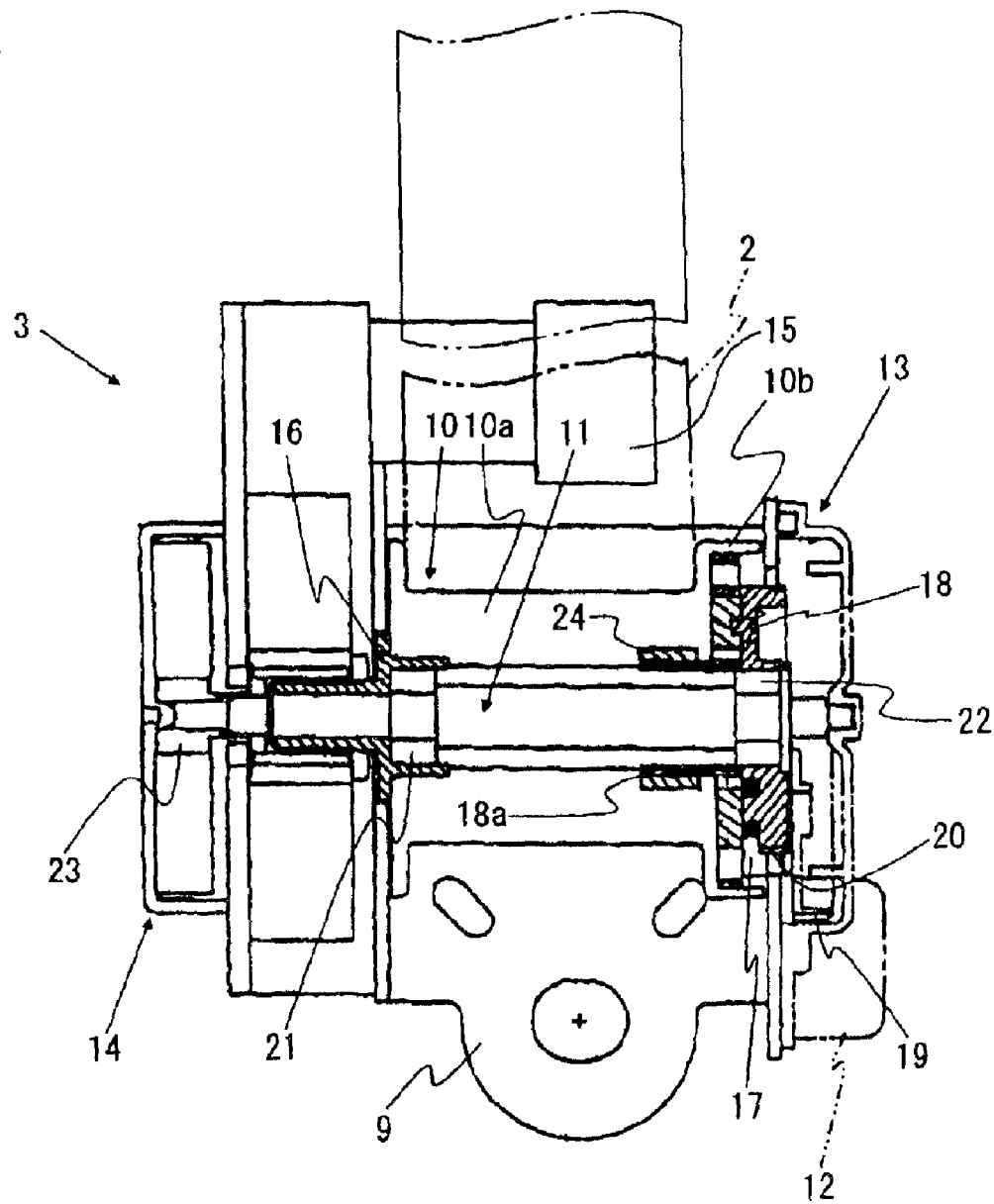
FIG. 2 is a vertical cross-section showing an example of the overall structure of a retractor device.

FIG. 2 is a longitudinal sectional view showing an example of an overall structure of the retractor device 3.

In FIG. 2, the retractor device 3 may include a frame 9, a spool 10 for retracting the seatbelt 2, a torsion bar 11 composed of a material that can undergo torsional deformation, a deceleration detecting means 12 that becomes active as it detects a large vehicle deceleration under an emergency situation, a lock mechanism 13 for at least preventing the spool 10 from rotating in the withdrawing direction of the belt a spring means 14 having a spiral spring, a pretensioner 15 that becomes active under an emergency situation to generate a belt-retracting torque, and a bushing 16 for transmitting the seatbelt-retracting torque generated by the pretensioner 15 to the spool 10.

The lock mechanism 13 may include a locking base 18 for rockably supporting a pawl 17, and a lock gear 19. The lock gear 19 is sufficient if it has a known configuration and thus a detailed illustration of the structure is omitted in the drawing. The lock gear 19 normally rotates integrally with the torsion bar 11, but stops as the deceleration detecting means 12 is activated under an emergency situation to generate a relative rotational difference between the torsion bar 11 and the lock gear 19 and to thereby allow the pawl 17 to engage with an internal gear 20 at the side wall of the frame 9. As a result, the locking base 18 (in other words, the spool 10) is prevented from rotating in the belt-withdrawing direction. Note that, at this time, although a detailed illustration is omitted, the locking base 18 of the lock mechanism 13 relatively rotates in the seatbelt-withdrawing direction with respect to the lock gear 19 in response to a sudden withdrawal of the seatbelt 2. As a result, the withdrawal of the seatbelt 2 is prevented in the same manner described above.

The torsion bar 11 is loose-fitted into the inner-periphery side of the spool 10 (to be more specific, at the center in the radial direction) by penetrating the spool 10 in the axial direction. The torsion bar 11 may have a first torque-transmitting portion 21, which is disposed at a first end (the left end in FIG. 2) thereof in the axial direction and engaged with a first end of the spool 10 in the axial direction such that the first torque-transmitting portion 21 is not rotatable relative to a second end of the spool 10. The torsion bar 11 further may have a second torque-transmitting portion 22, which is disposed at a second end (the right end in FIG. 2) thereof in the axial direction and engaged with the locking base 18 such that the second torque-transmitting portion 22 is not rotatable relative to locking base 18. (That is, the second torque-transmitting portion 22 is supported by the locking base 18 so as to be rotatable with the locking base 18.) The torsion bar 11 operates to rotatably connect the spool 10 with the lock mechanism 13.

The spool 10 may have a main cylindrical body 10a for retracting the seatbelt 2 and a large-diameter cylindrical body 10b having a diameter larger than that of the main cylindrical body 10a, and is rotatably supported between the two side walls of the frame 9. The spool 10 may be constantly urged in the seatbelt retracting direction by the spring force of the spiral spring in the spring means 14 and through a bushing 23, the torsion bar 11, the first torque-transmitting portion 21 of the torsion bar 11, and the bushing 16. Due to this structure, the first end side of the torsion bar 11 in the axial direction (the left side in FIG. 2) is connected to the spool 10 in an integrally rotatable manner. When the pretensioner 15 is activated, the belt-retracting torque generated by the pretensioner 15 is transmitted to the spool 10 through the bushing 16, and the spool 10 thereby retracts a predetermined amount of the seatbelt 2.

A circular relative rotation lock member 24 may be disposed between the spool 10 and a shaft portion 18a of the locking base 18. The circular relative rotation lock member 24 has an internal thread (not shown) formed on the inner peripheral surface so that an external thread (not shown) formed on the locking base shaft portion 18a is screwed into the internal thread, and is fitted into a hole in the spool 10 extending in the axial direction such that the circular relative rotation lock member 24 cannot rotate relative to the spool 10 but can move in the axial direction. As the spool 10 rotates relative to the locking base 18 in the belt-withdrawing direction, the circular relative rotation lock member 24 rotates integrally with the spool 10 and moves right in FIG. 2.

Referring back to FIG. 1, in a seatbelt device 1 having the above-described basic configuration, an occupant 25 withdraws the seatbelt 2 from the retractor device 3 by resisting the retracting force of the retractor device 3 and inserts the tongue 4 of the seatbelt 2 into the buckle unit 5 to fasten the seatbelt 2. The state of fastening the seatbelt 2 is indicated by a dash-dot line in FIG. 1. As shown in the drawing the occupant 25 fastens the seatbelt 2 around the chest and the lower abdomen so as to restrain himself/herself to a seat 26.

A distinguishing feature of the seatbelt device having the above-described structure is that filament yarn bundles containing middle-shrinking yarns are used in at least one of the warp and weft yarns constituting the woven belt, i.e., the seatbelt 2.

When the warp or weft yarns include middle-shrinking synthetic filament yarns having a shrinkage ratio (e.g., a shrinkage ratio of 15% to 20% under a dyeing condition of curing at 210° C. for 180 seconds) higher than the shrinkage ratio of typical synthetic filament yarns (e.g., a shrinkage ratio of 10% or less of low-shrinking yarns), the yarns subjected to the heat treatment melt and strongly adhere to neighboring yarns through fusion-bonding. Thus, the strength of the filament yarn bundles as a whole can be improved. In addition, when the shrinkage ratio is kept relatively lower than that of high-shrinking yarn which is 20% to 60%, the filament yarns hardly shrink (the property of the filament yarns is hardly changed) even in a high-temperature environment. As a result, the transportation performance can be improved. In the seatbelt device, the strength and wear resistance of the filament yarn bundles of the woven belt may be improved by using the middle-shrinking synthetic filament yarns, as described above.

The woven belt according to an embodiment of the present invention containing middle-shrinking synthetic filament yarns in the warp yarns is described in detail below.

Figure 3:
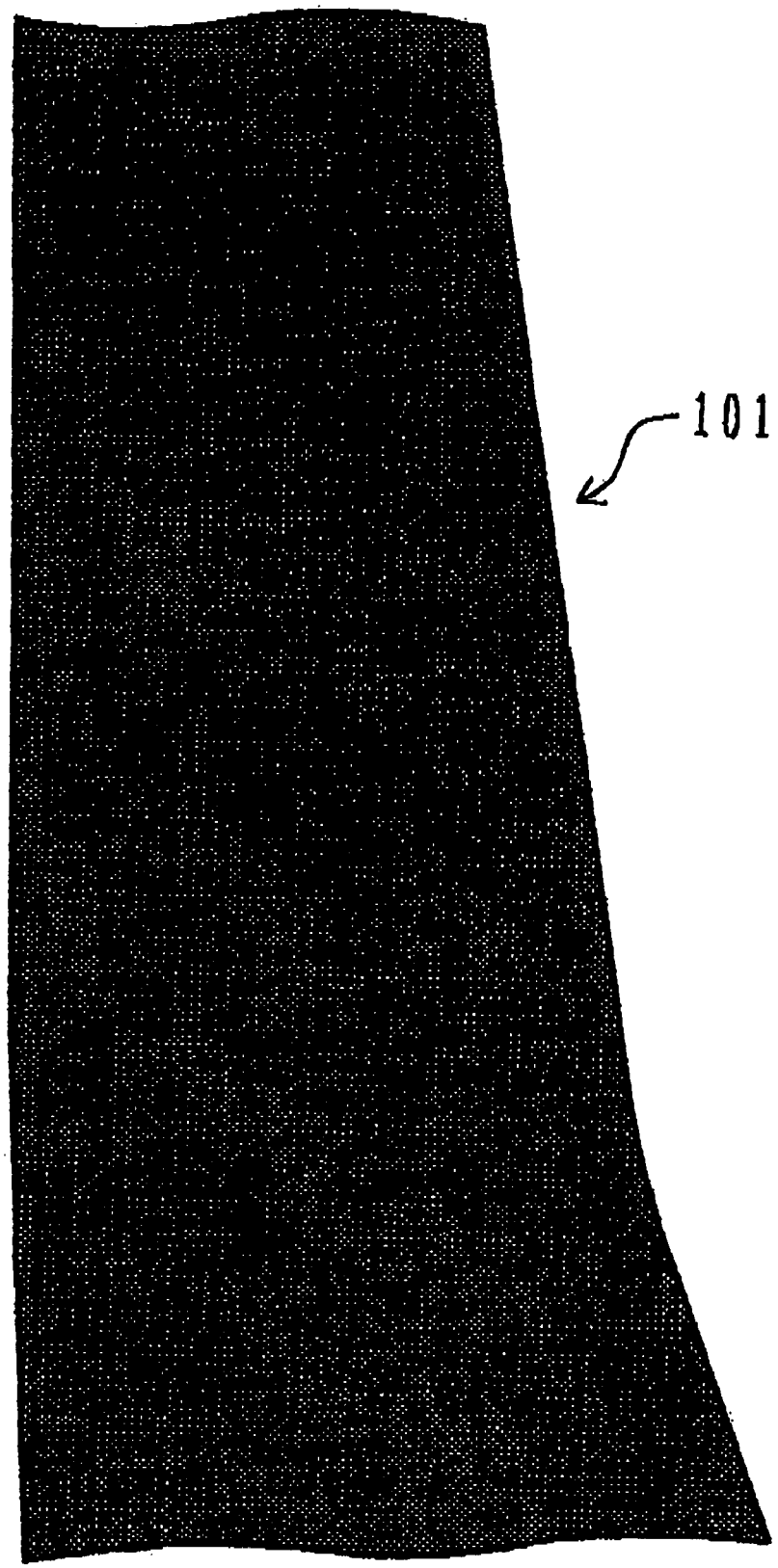
FIG. 3 is an external view of a woven belt according to one embodiment of the present invention.
Figure 4:
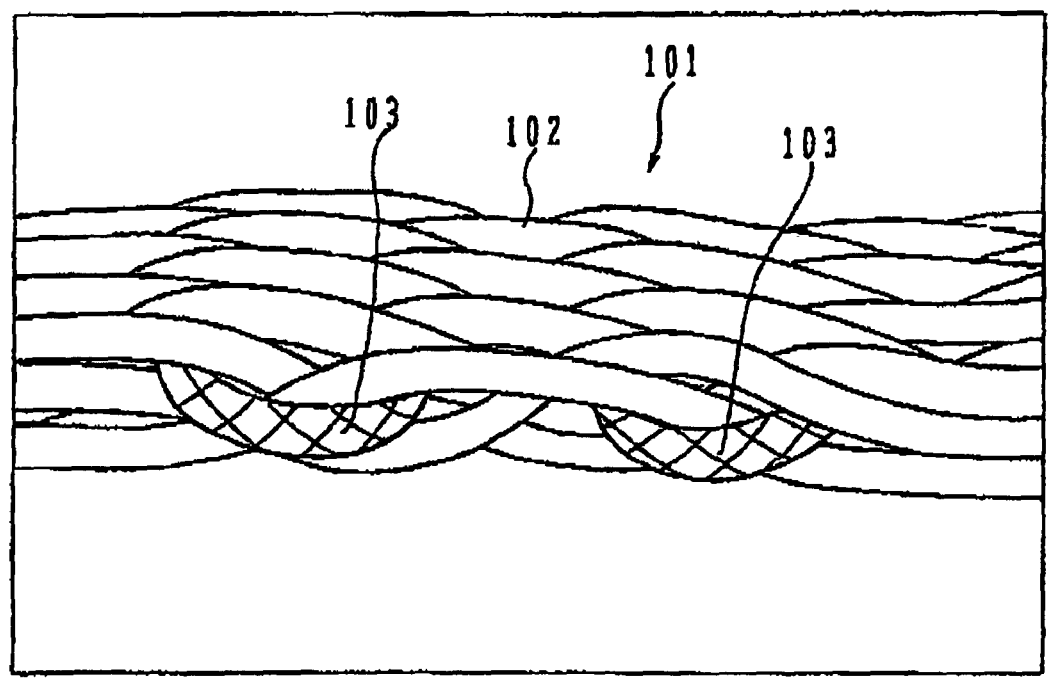
FIG. 4 is an enlarged side view of the woven belt according to an embodiment of the present invention.

FIG. 3 is an external view of a woven belt according to one embodiment, and FIG. 4 is an enlarged side view of the woven belt according to an embodiment of the present invention. Referring to FIG. 3, a woven belt 101 may be a strip-shaped cloth elongated in the vertical direction of the drawing. The drawing shows a state in which no parts, such as a tongue, are attached at the end.

As shown in FIG. 4, the belt may have a structure formed by weaving a plurality of warp yarns 102 extending in a substantially longitudinal direction of the belt and a plurality of weft yarns 103 (the shaded portion in the drawing) extending in a substantially transverse direction of the belt. The weft yarns extend in a substantially straight manner as they extend across in the transverse direction of the woven belt 101 in a reciprocating fashion. In contrast, the warp yarns 102 cross over the weft yarns 103, which extend parallel to each other, by forming undulating shapes.

Both the warp yarns 102 and the weft yarns 103 are filament yarn bundles of a plurality of single yarns 104 (filaments being the smallest unit of yarns). Of these, the warp yarns 102 may be made of typical synthetic filament yarns. Typically, the warp yarns 102 are composed of polyethylene terephthalate polymers produced by esterification of terephthalic acid and ethylene glycol. In contrast, the weft yarns 103 may be constituted from polyester synthetic filament yarns incorporating middle-shrinking synthetic filament yarns. The yarns are non-twist yarns entangled at predetermined intervals.

Figure 5A:
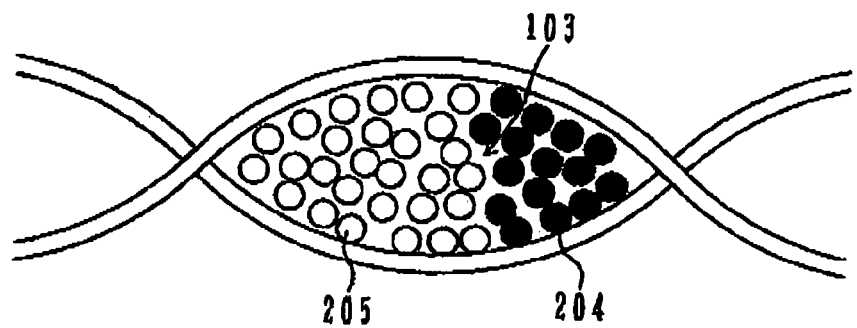
FIG. 5 shows examples of cross-sectional structures of weft yarns of the woven belt according to embodiments of the present invention.
Figure 5B:
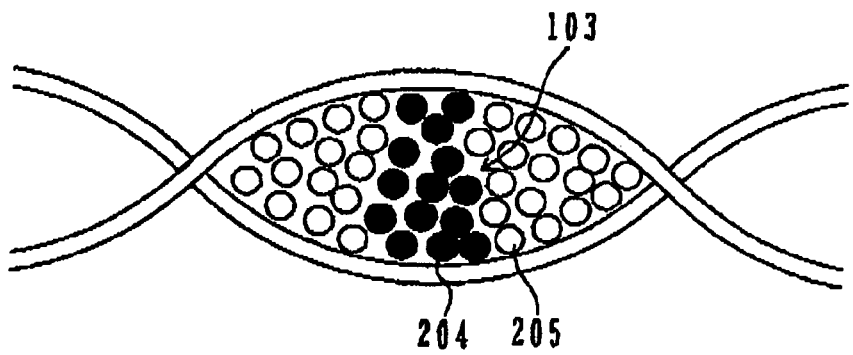
Figure 5C:
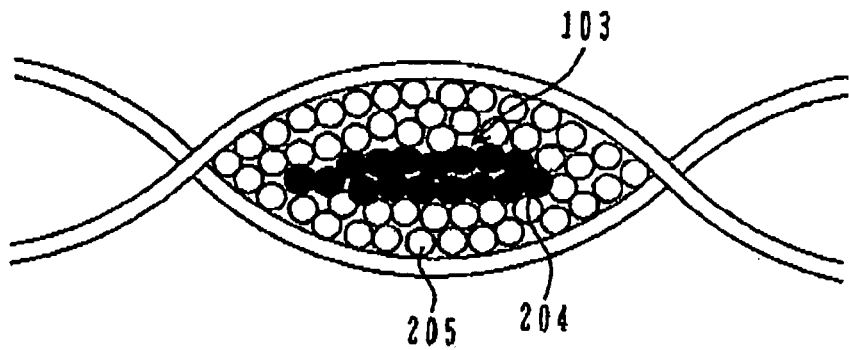

FIGS. 5(*a*)-(*c*) each show an example of a cross-sectional structure of the weft yarn 103 of the woven belt according to an embodiment of the present invention.

In each of FIGS. 5(*a*), 5(*b*), and 5(*c*), the weft yarn 103 is a filament yarn bundle of non-twist yarns, about one third of which are middle-shrinking synthetic filament yarns 204 and the remainder of which are normal synthetic filament yarns 205.

In the example shown in FIG. 5(*a*), the middle-shrinking synthetic filament yarns 204 are arranged to huddle at one side (the right side in the drawing) of the cross-sectional structure of the weft yarn 103 while the normal synthetic filament yarns 205 are arranged to huddle at the other side (the left side in the drawing). Note that the drawing shows middle-shrinking synthetic filament yarns 204 after shrinkage. The middle-shrinking synthetic filament yarns 204 before shrinkage have a diameter larger tan that of the normal synthetic filament yarns 205, but the diameter becomes substantially equal to that of the normal synthetic filament yarns 205 after shrinkage.

In the example shown in FIG. 5(*b*), the middle-shrinking synthetic filament yarns 204 are arranged to huddle around the center of the cross-sectional structure of the weft yarn 103 while the normal synthetic filament yarns 205 are equally divided to huddle at both sides (the right and left sides) of the bundle of the middle-shrinking synthetic filament yarns 204. This is an example of the case in which the weaving is carried out by eliminating the disparity (nonuniformity) in FIG. 5(*a*) in the horizontal direction.

In the example shown in FIG. 5(*c*), the middle-shrinking synthetic filament yarns 204 are arranged to huddle at the center of the cross-sectional structure of the weft yarn 103 in all directions of the drawing, and the normal synthetic filament yarns 205 are arranged to uniformly surround the middle-shrinking synthetic filament yarns 204. This is an example of the case in which the weaving is carried out by further eliminating the disparity (nonuniformity) in FIG. 5(*b*) not only in the horizontal direction but also in the vertical direction.

Figure 6:
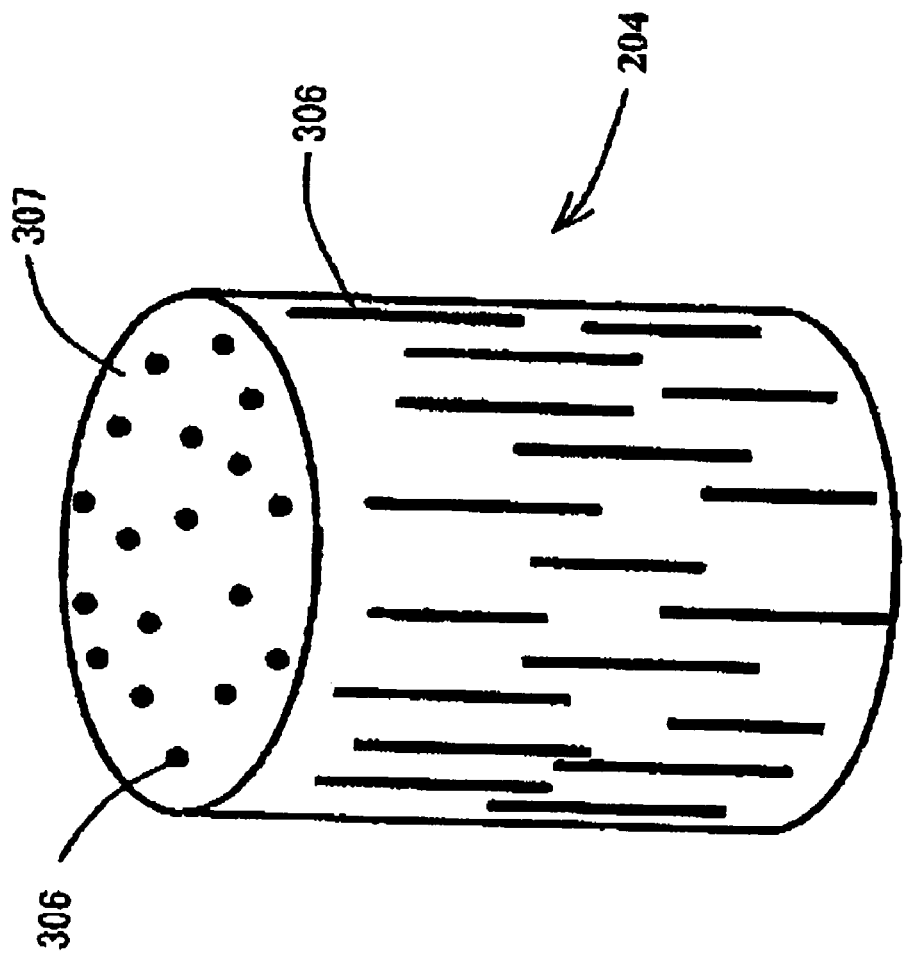
FIG. 6 is a cross-sectional oblique view showing an example of a middle-shrinking synthetic filament yarn.

FIG. 6 is an oblique sectional view of an example structure of a middle-shrinking synthetic filament yarn 204. In FIG. 6, the middle-shrinking synthetic filament yarn 204 may be composed of a high-melting-point filament component 307 (70%) and a divided acicular low-melting-point filament component 306 (30%) dispersed therein.

The middle-shrinking synthetic filament yarn 204 may be composed of a copolymer of polyethylene terephthalate described above and polyethylene isophthalate which are typically produced by esterification of terephthalic acid and isophthalic acid as starting materials, respectively, using ethylene glycol. As shown in FIG. 6, polyethylene isophthalate is dispersed in polyethylene terephthalate. In other words, the middle-shrinking synthetic filament yarn 204 is composed of a copolymer in which the low-melting-point filament component 306, which is polyethylene isophthalate having a low melting point, is blended into the high-melting-point filament component 307, which is polyethylene terephthalate having a high melting point. In this embodiment, a filament yarn unit, known as a multifilament, bundling the middle-shrinking synthetic filament yarns 204 (monofilaments) is used in part of the weft. By heating the woven belt 101 including such weft yarns, the dispersed low-melting-point filament component 306 melts to cause shrinkage of the monofilaments, and the multifilament is thereby converged into a monofilament and is hardened. As a result, the monofilament resulting from the shrinkage of the weft yarn exhibits a larger cross-sectional area and hardens, and the strength of the woven belt as a whole can be increased.

Note that the melting point of the middle-shrinking synthetic filament yarn 204 decreases as the copolymerization ratio of polyethylene isophthalate, i.e., the amount of polyethylene terephthalate used, increases. For example, a middle-shrinking synthetic filament yarn having a melting point of 230° C. is obtained when the copolymerization ratio of polyethylene isophthalate is 10% (polyethylene terephthalate: 90%), and a middle-shrinking synthetic filament yarn having a melting point of 160° C. is obtained when the copolymerization ratio of polyethylene isophthalate is 30% (polyethylene terephthalate: 70%). In this embodiment, a middle-shrinking synthetic filament yarn having an isophthalate copolymerization ratio of 10% and a melting point of 230° C. may be used.

Because of the structure shown in FIG. 6, the dispersed low-melting-point filament component 306 melts by heat treatment and a significantly high fusion-bonding effect can be exhibited in a single, middle-shrinking synthetic filament yarn 204 as a whole.

Figure 7:
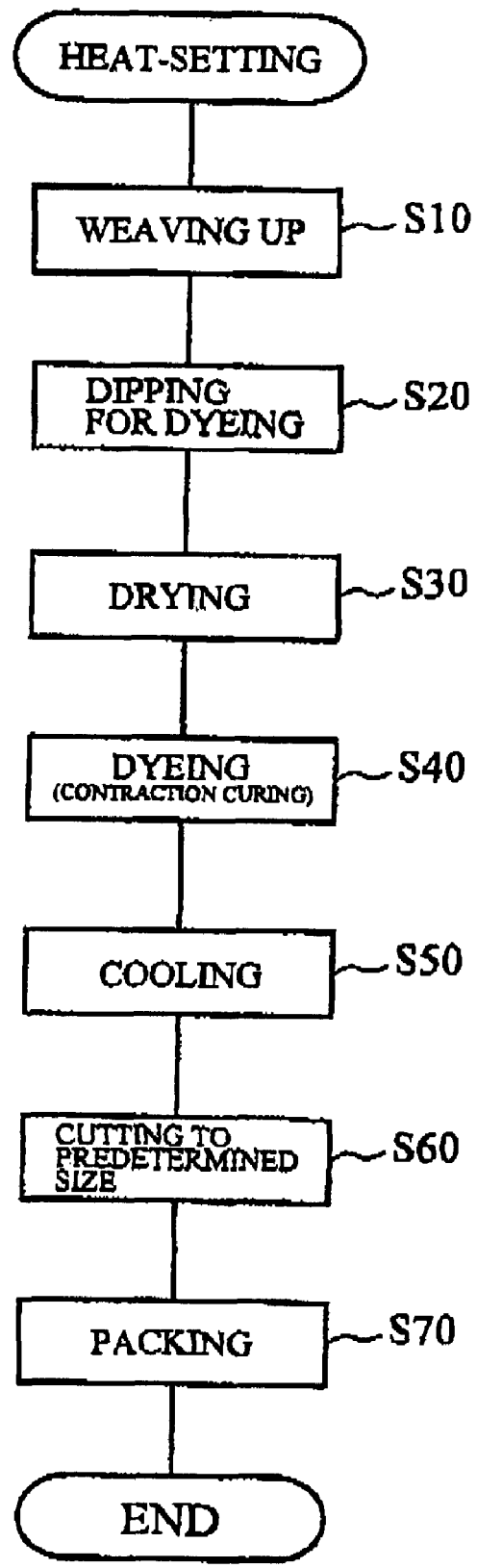
FIG. 7 is a flowchart showing a sequence of heat-treating the middle-shrinking synthetic filament yarn.

FIG. 7 is a flowchart showing a sequence of heat-treating (or heat-setting) the middle-shrinking synthetic filament yarn 204. The weft yarns 103 having the above-described structure and the warp yarns 102 are woven up (step S10), subjected to a predetermined dyeing treatment (step S20) and drying treatment (step S30), and then cured at 210° C. for 180 seconds to effect shrinkage (step 840). As a result, in the weft yarn 103, the middle-shrinking synthetic filament yarns 204 are contracted and formed into a thicker filament (see FIG. 5). Subsequently, the middle-shrinking synthetic filament yarns 204 are cooled to a predetermined temperature (step S50), cut to a predetermined size (step S60), and packed (step S70), to thereby end the sequence. As described above, when the middle-shrinking synthetic filament yarns 204 having a shrinkage ratio higher than regular synthetic filament yarns are used to form a filament yarn bundle, the middle-shrinking synthetic filament yarns 204 melt by heat treatment and strongly adhere onto surrounding filament yarns or filament yarn bundles through fusion-bonding. Consequently, the strength of the filament yarn bundle as a whole can be increased, and the wear resistance can be improved.

Non-twist yarns will now be described. FIG. 8(*a*) is an enlarged view of a part of the weft yarn 103 marked by a dashed circle in FIG. 8(*b*), and FIG. 8(*b*) shows a part where the weft yarn 103 intersects the warp yarn 102. Entanglements 105 shown in FIG. 8(*a*) are formed at predetermined intervals so that the single yarns 104 do not unravel from one another but can maintain the state of a filament yarn bundle. The intervals of the entanglements 105 may be adequately adjusted according to the size and number of the single yarns. Although a detailed enlarged illustration is omitted, as with the weft yarn 103, the warp yarn 102 also has entanglements at predetermined intervals. Such non-twist yarns can reduce the production cost because no twisting step is required, and can form a filament yarn bundle with increased strength and wear resistance.

As is described above, according to the woven belt 101, the strength of the filament yarn bundles can be improved by using the middle-shrinking synthetic filament yarns 204 in the weft yarns 103, and the wear resistance can be improved thereby. In addition, the transportation performance can be improved because the property of the filament yarns is hardly changed even in a high-temperature environment. In this case, by decreasing the density of either one of the filament yarn bundles of the weft yarn 103 and the warp yarn 102, per inch of the other filament yarn bundles to 20 picks or less, the undulating shape of the second filament yarn bundles after weaving can be moderated, and the stress concentration at the curved portions can be reduced. Thus, the strength can be further increased.

Because the warp yarns 102 and the weft yarns 103 have entanglements 105, the strength and the wear resistance can be secured by using non-twist yarns without using expensive twisted yarns. Thus, the production cost can be reduced.

Figure 9A:
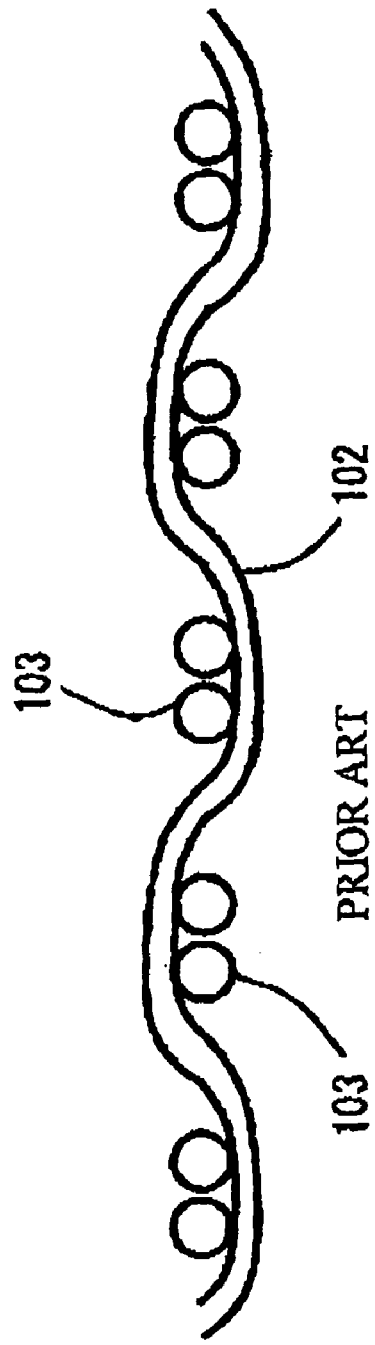
FIG. 9(*a*) is a side cross-sectional view of the weaving structure of a typical woven belt, and FIG. 9(*b*) is a side cross-sectional view of the weaving structure of the woven belt according to an embodiment of the present invention.
Figure 9B:
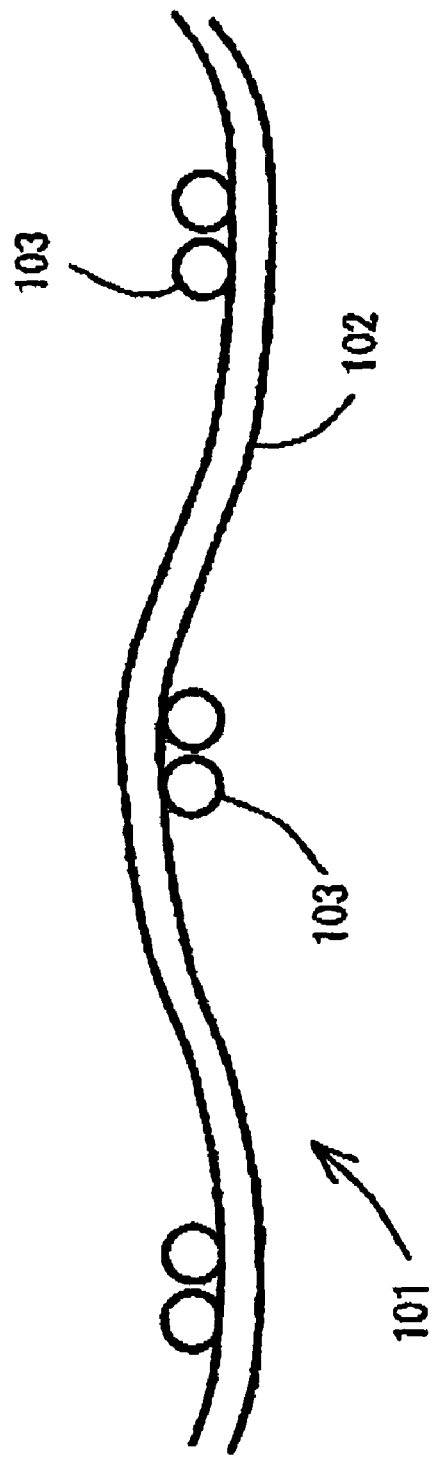

By utilizing and adapting the effect of increasing the strength and wear resistance described above, the number of the filament yarn bundles of the weft yarns 103 and the warp yarns 102 can be reduced from that of typical cases while maintaining the strength of the woven belt 101 to a normal level. For example, according to a conventional practice, as shown in FIG. 9(*a*), it has been necessary to use many weft yarns 103 at small intervals in order to increase the density of the woven belt as a whole and to thereby secure the strength of the woven belt. However, as shown in FIG. 9(*b*), the strength of the woven belt 101 can be maintained at a normal level even when the number of the weft yarns 103 is reduced to increase the intervals and, furthermore, even when the number of warp yarns is reduces. In this manner, the weight of the woven belt 101 as a whole can be reduced without decreasing the strength because fewer filament yarn bundles are used.

When the density of the filament yarn bundles of one of the weft yarns 103 and the warp yarns 102 is decreased to 20 picks or less per inch of the filament yarn bundles of the other, stress concentration at the curved portions can be moderated and the strength can be improved as described above. In addition, the strength of the warp yarns 102 can be maintained while reducing the number of the weft yarns 103 even when the number of the filament yarn bundles of the warp yarns 102 is reduced to achieve significant weight-reduction. The decrease in strength of the webbing in a substantially transverse direction caused by the reduced weft yarns 103 can be compensated to a normal level by incorporating the middle-shrinking synthetic filament yarns 204 in the weft yarns 103. Thus, when the webbing is applied to a seatbelt device, twisting, reversal, jamming, etc., of the belt can be prevented, and case of withdrawing can be improved.

The strength of the filament yarn bundles is increased by using the middle-shrinking synthetic filament yarns 204 in the weft yarns 103 while filament yarn bundles of normal synthetic filament yarns are used for the warp yarns 102. Even in this case, the strength can be increased compared to when both weft yarns and warp yarns are composed of normal filament yarn bundles.

Depending on the weaving structure, the second filament yarn bundles, i.e., the weft yarns 103, may be filament yarn bundles composed of normal synthetic filament yarns, and the first filament yarn bundles, i.e., the warp yarns 102, may be filament yarn bundles composed of middle-shrinking synthetic filament yarns 204. It is also possible to use the middle-shrinking synthetic filament yarns 204 in both the weft yarns 103 and the warp yarns 102. Alternatively, the middle-shrinking synthetic filament yarns 204 may be effectively used in part of the weft yarns 103 or the warp yarn 102. Regarding non-twist yarns, both the warp yarns 102 and the weft yarns 103 may be twisted yarns, or one of the warp yarns 102 and the weft yarns 103 may be twisted yarns.

The specific structures of the embodiments described above do not strictly define the contents of the present invention, and it is naturally possible that various modifications may be made in the details without departing from the spirit of the present invention. In particular, although the embodiments above are mainly described by using examples of applying the woven belt to the webbing of the seatbelt device used in vehicles and the like, the usage of the woven belt is not limited to these. The woven belt can be suitably used to bundle heavy articles such as construction materials and as general-purpose belts for suspension and transportation, e.g., other body-restrainers such as safety belts and harnesses.

The priority application Japanese Patent Application No. 2006-333433, filed Dec. 11, 2006, is incorporated by reference herein.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A woven belt comprising:
    first filament yarn bundles extending in a substantially longitudinal direction of a webbing; and
    second filament yarn bundles extending in a substantially transverse direction of the webbing,
    wherein at least one of the first filament yarn bundles and the second filament yarn bundles comprises filament yarn bundles containing middle-shrinking synthetic filament yarns which have a shrinkage ratio of a size after shrinkage of 15% to 20% relative to a size before shrinkage.

2. The woven belt according to claim 1, wherein the first filament yarn bundles comprise filament yarn bundles containing normal synthetic filament yarns and the second filament yarn bundles comprise filament yarn bundles containing the middle-shrinking synthetic filament yarns.

3. The woven belt according to claim 1, wherein the middle-shrinking synthetic filament yarns contain a low-melting-point filament component having a relatively low melting point and a high-melting-point filament component having a relatively high melting point.

4. The woven belt according to claim 3, wherein the middle-shrinking synthetic filament yarns contain the low-melting-point filament component dispersed in the high-melting-point filament component.

5. The woven belt according to claim 3, wherein the melting point of the high-melting-point filament component is 250° C. to 260° C., and the melting point of the low-melting-point filament component is 160° C. to 250° C.

6. The woven belt according to claim 1, wherein density of one of the first filament yarn bundles and the second filament yarn bundles is 20 picks per inch or less of the other of the first and second filament yarn bundles.

7. The woven belt according to claim 1, wherein at least one of the first filament yarn bundles and the second filament yarn bundles comprises filament yarn bundles containing non-twist yarns with entanglements.

8. The woven belt according to claim 1, wherein the middle-shrinking synthetic filament yarns comprise polyethylene terephthalate and polyethylene isophthalate.

9. A seatbelt device comprising:
    a woven belt as claimed in claim 1;
    a retractor device for retracting the woven belt;
    a buckle configured to be connected to a fixed side member of a vehicle; and
    a tongue that engages with the buckle, the tongue being attached to the woven belt.

10. A seatbelt device comprising:
    a woven belt for restraining an occupant;
    a retractor device for retracting the woven belt;
    a buckle configured to be connected to a fixed side member of a vehicle; and
    a tongue that engages with the buckle, the tongue being attached to the woven belt,
    wherein the woven belt comprises first filament yarn bundles extending in a substantially longitudinal direction of a webbing and second filament yarn bundles extending in a substantially transverse direction of the webbing, and
    wherein at least one of the first filament yarn bundles and the second filament yarn bundles comprises filament yarn bundles containing middle-shrinking synthetic filament yarns which have a shrinkage ratio of a size after shrinkage of 15% to 20% relative to a size before shrinkage.

* * * * *